United States Patent
Pan et al.

(10) Patent No.: US 12,497,737 B2
(45) Date of Patent: Dec. 16, 2025

(54) FILTER MEDIA

(71) Applicant: Mativ Holdings, Inc., Alpharetta, GA (US)

(72) Inventors: Jiayi Pan, Le Mans (FR); Christophe Le Moigne, Le Mans (FR); Nathalie Durot, Le Mans (FR); Michel Barale, Le Mans (FR); Stephane Derrien, Le Mans (FR)

(73) Assignee: SWM Holdings US, LLC, Alpharetta, GA (US)

( * ) Notice: Subject to any disclaimer, the term of this patent is extended or adjusted under 35 U.S.C. 154(b) by 880 days.

(21) Appl. No.: 14/316,262

(22) Filed: Jun. 26, 2014

(65) Prior Publication Data

US 2015/0001148 A1      Jan. 1, 2015

Related U.S. Application Data

(60) Provisional application No. 61/839,608, filed on Jun. 26, 2013.

(51) Int. Cl.
  *D21H 27/08*      (2006.01)
  *A24D 3/08*       (2006.01)
  (Continued)

(52) U.S. Cl.
  CPC ............... *D21H 27/08* (2013.01); *A24D 3/08* (2013.01); *A24D 3/14* (2013.01); *B01D 39/18* (2013.01);
  (Continued)

(58) Field of Classification Search
  None
  See application file for complete search history.

(56) References Cited

U.S. PATENT DOCUMENTS 2,968,306 A * 1/1961 Touey .................. A24D 3/14
                                                131/334
3,019,794 A * 2/1962 Whitmore ............ A24D 3/14
                                                131/334
(Continued)

FOREIGN PATENT DOCUMENTS

EP        0304759 A2 *  1/1989
EP         606005 A1 *  7/1994  ............... A24D 1/02
(Continued)

OTHER PUBLICATIONS

Abstract of Chinese Publication CN 101167601 dated Apr. 30, 2008, 1, page.
(Continued)

*Primary Examiner* — Magali P Slawski
*Assistant Examiner* — Eric J Mccullough
(74) *Attorney, Agent, or Firm* — Dority & Manning, P.A.

(57) ABSTRACT

A filter element is disclosed made from a gathered paper web that may be crimped, embossed, and/or corrugated. In accordance with the present disclosure, the paper web is treated with at least two different additives. The first additive comprises amphiphilic molecules, having hydrophilic and hydrophobic ends such as a ketene dimer that has one or more branching groups. The second additive, on the other hand, may comprise a polymer component such as a polyalkylene glycol. The filter element may also be treated with a polyamine or an amino acid or salt thereof. In one embodiment, the filter element may be incorporated into the filter of a smoking article. The two additives together may improve smoke taste, reduce some smoke phenols, and reduce some smoke carbonyls.

20 Claims, 7 Drawing Sheets

(51) Int. Cl.
*A24D 3/14* (2006.01)
*B01D 39/18* (2006.01)
*B65D 85/808* (2006.01)
*D21H 17/53* (2006.01)

(52) U.S. Cl.
CPC .......... *B65D 85/808* (2013.01); *D21H 17/53* (2013.01); *B01D 2239/04* (2013.01)

(56) References Cited

U.S. PATENT DOCUMENTS

| | | | |
|---|---|---|---|
| 3,227,164 A * | 1/1966 | Mcconnell | A24D 3/14 131/343 |
| 3,353,541 A | 11/1967 | Hind et al. | |
| 3,386,449 A | 6/1968 | Hind | |
| 3,400,723 A | 9/1968 | Muller | |
| 3,415,253 A | 12/1968 | Michels et al. | |
| 3,420,241 A | 1/1969 | Hind et al. | |
| 3,428,053 A | 2/1969 | Schoenbaum et al. | |
| 3,467,109 A | 9/1969 | Block et al. | |
| 3,483,874 A | 12/1969 | Hind | |
| 3,561,451 A | 2/1971 | Jacin | |
| 3,608,564 A * | 9/1971 | Takahashi | A24D 3/08 131/342 |
| 3,760,815 A | 9/1973 | Deszyck | |
| 3,847,164 A | 11/1974 | Mattina et al. | |
| 3,860,012 A | 1/1975 | Selke | |
| 4,182,349 A | 1/1980 | Selke | |
| 4,355,995 A | 10/1982 | Berger | |
| 4,614,546 A * | 9/1986 | Schroer | D21H 17/17 106/209.1 |
| 4,674,519 A | 6/1987 | Keritsis et al. | |
| 5,025,814 A * | 6/1991 | Raker | A24D 3/08 131/331 |
| 5,360,023 A | 11/1994 | Blakley et al. | |
| 5,439,010 A * | 8/1995 | Ross | A24D 1/02 131/331 |
| 5,678,577 A * | 10/1997 | Matsumura | A24D 3/068 131/331 |
| 5,698,627 A | 12/1997 | Obuni et al. | |
| 5,715,844 A | 2/1998 | Young et al. | |
| 5,724,998 A | 3/1998 | Gellatly et al. | |
| 5,765,570 A | 6/1998 | Litzinger et al. | |
| 5,856,006 A * | 1/1999 | Asai | A24D 3/065 131/332 |
| 5,947,126 A * | 9/1999 | Wilson | A24D 3/10 131/345 |
| 6,310,132 B1 | 10/2001 | Sackmann et al. | |
| 6,344,239 B1 * | 2/2002 | Asai | A24D 3/065 131/342 |
| 6,457,475 B1 * | 10/2002 | Tani | A24D 1/02 131/361 |
| 6,503,604 B1 | 1/2003 | Kasahara et al. | |
| 6,666,952 B2 | 12/2003 | Dilts et al. | |
| 6,676,806 B1 * | 1/2004 | Butt, Sr. | A24D 1/02 131/362 |
| 6,749,721 B2 | 6/2004 | Shannon et al. | |
| 7,900,639 B2 | 3/2011 | Perfetti et al. | |
| 8,333,872 B2 | 12/2012 | Propst, Jr. et al. | |
| 8,425,726 B2 | 4/2013 | Buwono et al. | |
| 8,434,498 B2 | 5/2013 | Sebastian | |
| 8,597,667 B2 | 12/2013 | Mou et al. | |
| 2003/0183239 A1 * | 10/2003 | Lesser | A24B 15/282 131/335 |
| 2005/0000526 A1 | 1/2005 | Tarora et al. | |
| 2006/0289023 A1 * | 12/2006 | Von Borstel | A24D 3/08 131/334 |
| 2007/0107865 A1 | 5/2007 | Tammi et al. | |
| 2011/0023900 A1 * | 2/2011 | Clarke | A24D 3/0208 131/345 |
| 2012/0067359 A1 * | 3/2012 | Clarke | A24B 15/165 131/275 |
| 2012/0120229 A1 * | 5/2012 | Brantley | B65B 19/28 348/92 |
| 2013/0025611 A1 | 1/2013 | Rushforth et al. | |
| 2013/0137561 A1 | 5/2013 | Sampson | |

FOREIGN PATENT DOCUMENTS

| | | | |
|---|---|---|---|
| GB | 2046572 A * | 11/1980 | ............. A24D 3/043 |
| GB | 2075328 | 11/1981 | |
| WO | WO-2004022850 A1 * | 3/2004 | ............. D21H 21/16 |

OTHER PUBLICATIONS

Abstract of Chinese Publication CN103120364, dated May 29, 2013, 2 pages.
International Search Report PCT/IB2014/062640, dated Mar. 31, 2015, 16 pages.

* cited by examiner

FILTER MEDIA

RELATED APPLICATIONS

The present application is based upon and claims priority to U.S. Provisional Application Ser. No. 61/839,608, which was filed on Jun. 26, 2013 and which is incorporated herein by reference.

BACKGROUND

Smoking articles such as cigarettes are conventionally made by wrapping a column of tobacco in white wrapping paper. At one end, the smoking article usually includes a filter through which the article is smoked. Filters are attached to smoking articles using a tipping paper which is glued to the white wrapping paper. Although there are some exceptions, conventional filters are typically formed from cellulose acetate tows. Optionally, between the filter material and the tipping paper exists a non porous or porous plug wrap that holds the filter together prior to attachment to the wrapped column of tobacco. In certain applications, however, a plug wrap paper is not used or needed.

The paper components used to produce smoking articles not only provide structure but also contribute to or adjust many physical properties and characteristics of the cigarette. For instance, the paper can be used to adjust the rate at which the cigarette burns, the number of puffs per cigarette, and the total tar delivery per puff. Many of the above properties are controlled by producing paper with a particular porosity.

As explained above, conventional filters are typically formed from cellulose acetate. Cellulose acetate, however, is not only relatively expensive to produce, but biodegrades very slowly. The slow rate of biodegradation of cellulose acetate is particularly troubling since the filter is not consumed during use of the smoking article. Consequently, discarded filters are commonly found in the environment, especially outside of buildings and along roadways.

In view of the above, those skilled in the art have attempted to replace cellulose acetate with other materials. For instance, in U.S. Pat. No. 5,360,023, a filter element for a cigarette is disclosed formed from a gathered web of paper that incorporates a carbonaceous material.

UK Patent Application GB2075328 discloses a tobacco smoke filter comprising a corrugated and/or fibrillated web of paper gathered laterally in rod form.

The use of paper as a filter for smoking articles can provide numerous advantages. For instance, paper filters quickly biodegrade. The filtration properties of a paper filter can also be varied and controlled.

Unfortunately, however, paper filters present a number of drawbacks. For instance, paper filters can produce astringency, bitterness, wood taste, paper taste, harshness, irritation, and dry taste. Paper filters, for instance, can result in a sensory attribute that may be described as a drying-out, roughening, and puckering sensation felt in the mouth. Paper filters can result in an irritating taste in the nose, mouth, and throat resulting in harshness. The dry taste and bitterness is believed to result from the inability of standard paper filters to filter and remove various components of the mainstream smoke typically removed by cellulose acetate containing plasticizers. These components include phenols, such as phenol, cresol and/or resorcinol. Other components that may create a dry or irritating taste include some acids, some aldehydes, such as crotonaldehyde, some ketones, some esters, some alcohols, some amides, and some pyrroles.

In addition, paper filters could be more retentive for tar and have a tendency to absorb smoke components to a different degree than cellulose acetate which could result in a paper taste. A paper taste is sometimes described as a smell from burning paper.

In view of the above, a need exists for a paper filter for a smoking article that reduces the dry taste and wood taste normally associated with paper filters and reduces selectively certain smoke constituents. A need also exists for a paper filter that may be used in other fields to filter various aerosol fluids, including gasses.

SUMMARY

In general, the present disclosure is directed to a filter element. Although the filter element may be used in numerous fields and have various different applications, in one embodiment, the filter element may be incorporated into a smoking article for filtering mainstream smoke. The filtering element is generally comprised of a paper containing wood pulp fibers, other plant fibers, synthetic fibers, or mixtures thereof. Wood pulp and/or other plant fibers that may be used include hardwood fibers, softwood fibers, flax fibers, and the like. In one embodiment, the wood pulp fibers or other plant fibers may be obtained from tobacco plants. For instance, the fibers may have originated from tobacco scraps, tobacco stems, fines, and/or other tobacco by-products.

Different processes can be applied to produce the base web using techniques well known in the nonwoven and woven paper fields. These processes can include air laid processes, spunlaid processes, meltblown processes and wet laid processes. In order to minimize the harsh, bitter, irritation, wood, paper, astringency, and dry taste normally associated with paper filters, the paper of the present disclosure incorporates a combination of additives added to the paper filter or by the use of modified fibers or filler containing these additives or derivatives.

For instance, in one embodiment, the present disclosure is directed to a filter element that comprises a base web containing pulp fibers and/or a tobacco material. The base web is combined with at least a first additive and a second additive. In one embodiment, the base web may contain a third additive. The third additive may be only combined with the first additive, only combined with the second additive, or may be present in the base web with both the first additive and the second additive.

In one embodiment, the first additive comprises the following:

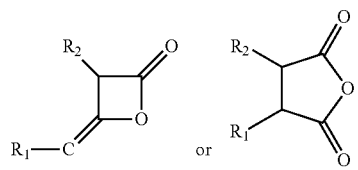

wherein $R_1$ and $R_2$ are organic groups, such as alkyl or alkenyl groups. In one embodiment, the first additive comprises an alkyl ketene dimer or alkenyl ketene dimer or alkyl succinic anhydride. In other embodiments, the first additive may comprise a nonfibrous compound or polymer, such as polyvinyl alcohol, rosins, acrylic copolymers such as styrene acrylic copolymers, modified starches, hydrocolloids such as gelatins, and the like. The first additive can be modified natural or synthetic fibers or a filler on which the additive or its derivative could be present by different means such as grafting, coating, inclusion, dusting, and other techniques well known to those skilled in the art. The first additive may comprise a mixture of any of the above compounds. The first additive can be present in the base web in an amount from about 0.01% to about 30% by weight, such as from about 0.05% to about 10% by weight of the base web. In one embodiment, the first additive can be present in the base web in an amount greater than about 15% by weight, such as in an amount greater than 20% by weight. For example, in one embodiment, the first additive can be present in the base web in an amount from about 18% to about 30% by weight.

The second additive may comprise a polymer component. For instance, the second additive may comprise a polyether, such as a polyalkylene glycol. The second additive may also comprise monopropylene glycol, sorbitol, glycerin, triacetin, or mixtures thereof. In one embodiment, the second additive may comprise a polyethylene glycol or polyethylene oxide or methoxypolyethylene glycol or PEG derivative. The polyalkylene glycol can have an average molecular weight of greater than about 500 g/mol, such as from about 500 g/mol to about 3000 g/mol, such as from about 500 g/mol to about 1000 g/mol. The second additive may be present on the base web in an amount from about 1% to about 30% by weight, such as in an amount from about 5% to about 25% by weight, based on the weight of the base web. The second additive or mixture of them can be a modified fiber (natural or synthetic) or filler or mixture thereof on which the additive or its derivative can be present by different means well known to those skilled in the art as described for the first additive.

In one embodiment, the first additive may be incorporated into or added to the base web, while the second additive may be applied to at least one surface of the base web. For instance, the first additive may be added as a sizing treatment to the base web in the wet end of the papermaking process. The second additive, on the other hand, may be added as a sizing agent or may be printed on the base web prior to or after the base web has been dried. In one embodiment, the second additive can be printed on the base web in a pattern so as to cover from about 10% to about 100% of the surface area of the base web.

In one embodiment, the first and the second additive can be applied by other techniques, such as coating, spraying, dusting printing, transfer, inclusion or the like, depending on the process applied to form the base web such as wet laid process, dry laid process, meltblown process, spunlaid process or the like.

As described above, in one embodiment, the base web may further contain a third additive. The third additive may comprise an amine or polyamine, particularly an amino acid or an amino acid salt, and more particularly a basic amino acid or basic amino acid salt or a combination of them. In one embodiment, the amine or the polyamine could be a polyethyleneimine, a polyuria, a polyamide, a functionalized fiber or filler with amino groups.

In one embodiment, the amino acid may comprise a glycinate. The glycinate may be in a basic form and may comprise an alkaline glycinate, such as sodium glycinate. Other amino acids or peptides (chains of amino acids) that may be used include amino acids with hydrophobic side chains such as alanine, valine, isoleucine, leucine, phenylalanine; amino acids with electrically charged side chains such as lysine, arginine, glumanic acid; amino acids with uncharged side chains such as glutamine, serine; non proteic amino acids such as citrulline, ornithine; and any other suitable peptides or protein extracts. These amino acids can also be in alkaline form, mixtures thereof, and the like.

In one embodiment, in order to use an amino acid in its basic form, the amino acid may comprise a salt that has been reacted with an alkaline metal or an alkaline earth metal. Addition of the amino acid can reduce carbonyls components in the mainstream smoke and improve smoke taste.

When present, the third additive may be added as a sizing treatment or applied to an exterior surface of the base web prior to or after the base web has been dried or inside the web during processing. The third additive or mixture of additives can also be a modified fiber (natural or synthetic) or filler or mixture of them on which the additive or its derivative could be present by different means well known to those skilled in the art as described for the first and second additive. The third additive can be present in the base web in an amount from about 1% to about 30% by weight, such as in an amount from about 5% to about 25% by weight, based on the weight of the base web.

The base web can have a basis weight of from about 10 gsm to about 200 gsm.

The present disclosure is also directed to a smoking article that comprises a column of tobacco surrounded by a wrapping paper. A filter is located adjacent to one end of the column of tobacco. A tipping paper may be used to attach the filter to the column of tobacco. In accordance with the present disclosure, the filter contains the filter element as described above.

In addition to being incorporated into a filter for a smoking article, the treated paper of the present disclosure may be used in numerous other applications. For instance, the treated paper may be used for filtering an aerosol, as a filter in an engine exhaust, as a filter in an air filtration system, as a tea bag filter, as a coffee filter, as a pouch for snuff or smokeless tobacco, or the like.

Other features and aspects of the present disclosure are discussed in greater detail below.

BRIEF DESCRIPTION OF THE DRAWINGS

A full and enabling disclosure of the present invention is set forth more particularly in the remainder of the specification, including reference to the appended figures in which.

Figure 1:
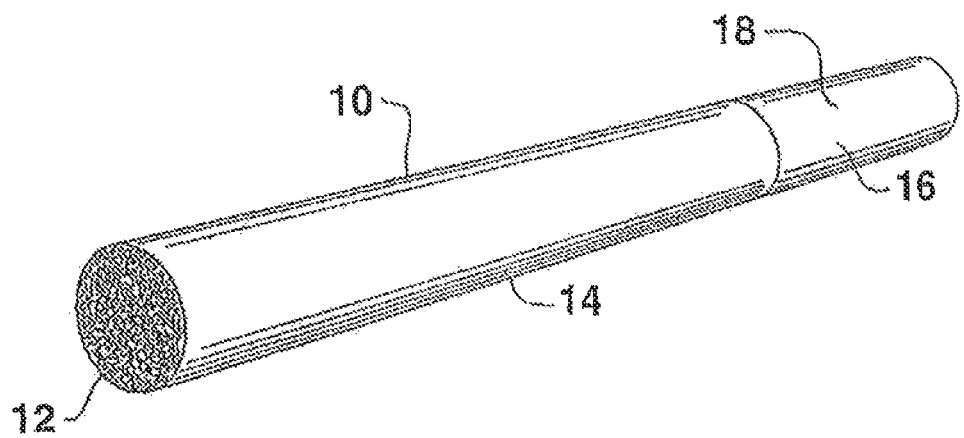
FIG. 1 is a perspective view of a conventionally made cigarette.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a filter element that may be contained in a filter for filtering an aerosol. In one embodiment, for instance, the filter element can be incorporated into a filter for a smoking article such as a cigarette. The filter element comprises a paper containing a combination of additives. In accordance with the present disclosure, the additives comprise a first additive that reduces absorption. The filter element includes a second additive that is believed to selectively reduce some chemical components contained in the mainstream smoke of a smoking article. The combination of additives have been found to synergistically reduce and minimize the dry, astringent, harsh, wood, paper, irritation, and bitter taste normally associated with paper filters when incorporated into a smoking article.

In one embodiment, the first additive added to the paper comprises an amphiphilic compound or polymer such as an alkylated ketene such as an alkylated diketene. The second additive, on the other hand, may comprise a polyether, monopropylene glycol, sorbitol, glycerin, triacetin, or mixtures thereof. The second additive may comprise, for instance, a polyalkylene glycol, such as polyethylene glycol.

In certain embodiments, the filter element may optionally include a third additive, which may comprise one or more amino acids or polyamine or salts thereof. The presence of an amino acid has been found to significantly reduce carbonyl components in the mainstream smoke and improve taste. In one embodiment, the filter element may contain the first additive combined with the third additive. In an alternative embodiment, the filter element may comprise the second additive combined with the third additive. In still another embodiment, the filter element may contain all three additives.

It has been discovered that the combination of the above two or three additives provides numerous advantages and benefits when the paper is used as a filter, particularly for a smoking article.

For instance, when incorporated into a filter for a smoking article, the filter element of the present disclosure can selectively remove various constituents from the mainstream smoke. For instance, the additives can synergistically work together to remove various Hoffmann analytes that may be present in the mainstream smoke, particularly phenols and/or carbonyls. For instance, phenolic compounds that may be selectively removed from the mainstream smoke by the filter element may include phenol, cresol, and the like.

For example, a filter made in accordance with the present disclosure, when attached to a smoking article, may remove at least 10%, such as at least 20%, such as least 30%, such as at least 40%, such as even at least 50% of some phenols such as phenol or cresol contained in the mainstream smoke. In one embodiment, up to 70%, such as up to 60%, such as up to 50%, such as up to 40%, of the phenolic compounds can be removed. In order to determine the amount of a constituent removed from the mainstream smoke, two identical smoking articles are produced, one with a filter made in accordance with the present disclosure and one with a filter made from the same identical paper that is untreated and does not contain the first additive and the second additive. The two smoking articles are lit and smoked on a smoking machine and the mainstream constituents are measured.

In addition to phenolic compounds, the filter element of the present disclosure is also capable of removing some carbonyls and some aldehydes from the mainstream smoke. For instance, at least 10%, such as at least 15%, such as at least 20%, such as even at least 25% of crotonaldehyde contained in the mainstream smoke can be removed. When an amino acid or polyamine is present, total carbonyls may be reduced by more than 10%, such as more than 15% and up to about 50%. In addition, formaldehyde may be reduced by greater than 50%, such as greater than 60%, such as greater than 70%, such as even greater than 80%. In addition, when an amino acid is present, crotonaldehyde can be reduced by greater than 50%, such as by greater than about 55%, such as up to about 60%.

The filter element of the present disclosure is also capable of removing hydrogen cyanide (HCN) from mainstream smoke. For instance, at least 10%, such as at least 30%, such as at least 40% of HCN contained in the mainstream smoke can be removed. In general, HCN can be removed from the mainstream smoke in an amount up to about 80%.

By removing various constituents from the mainstream smoke, and for other reasons that remain unknown, filter elements made in accordance with the present disclosure when attached to a smoking article also provide taste improvement over conventional filters made from a paper. The filter element of the present disclosure results in the reduction of dry and paper and wood and bitter taste and the reduction of irritation and harshness and astringency when the smoking article is consumed. Ultimately, filters made in accordance with the present disclosure produce a mainstream smoke that is cleaner, sweeter, and smoother to a smoker.

Papers made in accordance with the present disclosure can also provide other advantages. For instance, papers treated in accordance with the present disclosure also have improved filter making machinability and paper strength. Once treated in accordance with the present disclosure, the papers generally have a smoother surface that results in less friction. Ultimately, the surface of the paper has greater strength, improved printability, and improved water resistance.

As generally described above, the filter element of the present disclosure comprises a base web containing wood pulp fibers and/or other plant fibers that is treated with at least a first additive, second additive, and/or a third additive. In one embodiment, the base web may comprise a paper web containing primarily pulp fibers, such as softwood fibers, hardwood fibers, flax fibers, and the like or synthetic fiber or modified fibers or mixtures thereof. Alternatively, the base web may be made or comprise tobacco compounds such as reconstituted tobacco base sheet or reconstituted tobacco paper. Reconstituted tobacco may contain various tobacco material such as tobacco scraps, tobacco stems, tobacco stalks, cellulose fibers and the like.

In general, the first additive may comprise an amphiphilic compound or polymer. In one embodiment, the first additive can have a chemical structure as follows:

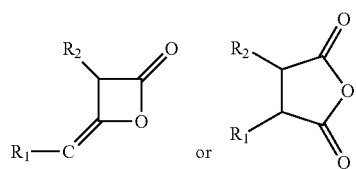

wherein $R_1$ and $R_2$ are organic groups such as alkyl or alkenyl groups. In one embodiment, for instance, $R_1$ and $R_2$ can be alkyl groups having a carbon chain length of from about 8 carbon atoms to about 40 carbon atoms, such as from about 12 carbon atoms to about 28 carbon atoms, such as from about 12 carbon atoms to about 16 carbon atoms. In one embodiment, for instance, the first additive comprises an alkyl ketene dimer.

The first additive is generally insoluble in water and prepared from fatty acids, such as stearic acid. The size of the R groups can be changed and controlled by selecting various fatty acid sources to produce the molecule.

In general, it is believed that the first additive bonds with cellulose to make the cellulosic fibers hydrophobic. The R groups, which may comprise hydrocarbon chains, may orient outwardly from the surface of the cellulose and/or tobacco material.

In other embodiments, the first additive may comprise polyvinyl alcohol, alkyl succinic anhydride, a rosin, an acrylic copolymer such as a styrene acrylic copolymer, a modified starch, a hydrocolloid such as a gelatin, a fibrous or non fibrous material, a filler containing one or several of these components or their derivatives or mixtures thereof.

In one embodiment, the first additive is added to the paper in accordance with the present disclosure in amounts generally from about 0.05% to about 15% by weight, such as in an amount from about 0.5% to about 10% by weight, such as in an amount from about 0.5% to about 7% by weight. In one embodiment, the first additive can be present in the paper in an amount greater than about 1% by weight, such as greater than about 4% by weight, such as greater than about 5% by weight. The first additive can be present in the paper in an amount less than about 10% by weight, such as in an amount less than about 9% by weight.

In an alternative embodiment, the first additive is present in the paper in an amount greater than about 5% by weight, such as in an amount greater than about 10% by weight, such as in an amount greater than about 15% by weight, such as in an amount greater than 20% by weight. The first additive is generally present in an amount less than about 35% by weight, such as in an amount less than about 30% by weight, such as in an amount less than about 28% by weight.

The second additive added to the paper in accordance with the present disclosure may comprise various different polymers or compounds. In one embodiment, the second additive may include free hydroxyl or ester groups in its chemical structure. The second additive, for instance, may comprise a polyether, monopropylene glycol, sorbitol, glycerin, a plasticizer such as triacetin, or mixtures thereof.

In one embodiment, for instance, the second additive comprises a polyalkylene glycol, such as polyethylene glycol, polypropylene glycol, a polyalkylene glycol derivative, or mixtures thereof.

The alkylene glycol may generally comprise an oligo-alkylene glycol. The oligo-alkylene glycol can comprise an ethylene glycol, propylene glycol, or a mixture of both. Suitable polyethylene glycols (PEG), such as PEG-550, PEG-600, or PEG-700, are commercially available usually as mixtures of oligomers characterized by an average molecular weight. In one embodiment, polyethylene glycol fragments of the PEG can have an average molecular weight from about 500 g/mol to about 3000 g/mol, such as from about 500 g/mol to about 1000 g/mol. Both linear and branched PEG molecules can be used.

Although most sources of PEG are characterized as a range of compounds based on the number of polyethylene-oxide subunits, narrower ranges are also available (commercially and otherwise) based on a controlled polymerization of ethylene oxide.

Each PEG, being a broad range of compounds varying in molecular weight as a function of the number of PEG units, is also subject to peak shaving, where either lower or higher molecular weight components are removed on either or both sides of the central, predominant component (e.g., by chromatographic separation). Representative ranges, for example, below and above the center for PEG-550 would be PEG-450 to PEG-650; for PEG-600, a range of PEG-500 to PEG-800; and for PEG-1000, a range of PEG-850 to PEG-1200. Various combinations and permutations of two or more PEGs could be pre-formed, in any ratio.

In one embodiment, the polyalkylene glycol may comprise a methoxypolyethylene glycol or a monomethylated alkylene glycol (MPEG). For many applications, however, a non-monomethylated polyethylene glycol is preferred.

In one embodiment, the second additive comprises a polyalkylene glycol having a molecular weight of from about 500 g/mol to about 3000 g/mol, such as from about 500 g/mol to about 1000 g/mol. In one embodiment, the polyalkylene glycol has a molecular weight of from about 550 g/mol to about 750 g/mol. Meanwhile, in one embodiment, the polyalkylene glycol has a molecular weight of from about 550 g/mol to about 3000 g/mol, such as from about 600 g/mol to about 3000 g/mol.

Although relatively high molecular weight polyalkylene glycols are generally preferred, in other embodiments, lower molecular weight polyalkylene glycols may be used. For instance, such polyalkylene glycols may have a molecular weight of from about 100 g/mol to about 500 g/mol.

The amount the second additive is applied to the paper can depend on various factors. In general, the second additive is applied to the paper in an amount from about 1% by weight to about 30% by weight, such as from about 5% by weight to about 25% by weight, based upon the weight of the base web. In various embodiments, the second additive may be present in the paper in an amount greater than about 10% by weight, such as in an amount greater than 12% by weight, such as in an amount greater than 15% by weight. For instance, the second additive may be present in the paper in an amount from about 10% to about 30% by weight, such as in an amount from about 15% to about 25% by weight.

The third additive that may optionally be present in the base web or paper may comprise a polyamine or an amino acid or a salt of an amino acid. In one embodiment, an amino acid or salt of an amino acid in an alkaline form is used. For example, the amino acid may comprise an aliphatic apolar amino acid such as glycine or its alkaline form such as sodium glycinate or potassium glycinate or mixtures thereof.

Other amino acids or peptides (chains of amino acids) that could be used are amino acids with hydrophobic side chains such as alanine, valine, isoleucine, leucine, and/or phenylalanine; amino acids with electrically charged side chains such as lysine, arginine, and/or glumanic acid; amino acids with uncharged side chains such as glutamine and/or serine; and non proteic amino acid such as citrulline and/or ornithine. These amino acids could also be under alkaline form, mixtures thereof, and the like.

The amino acid has been found to significantly reduce carbonyl components in the mainstream smoke and improve smoke taste.

When present, the third additive can be applied to the paper in an amount from about 1% to about 30% by weight, such as from about 5% by weight to about 25% by weight, based on the weight of the base web.

The manner in which the first additive, the second additive, and/or the third additive are applied to the base web or paper in accordance with the present disclosure can vary depending upon the particular application. The additives can be added to the base web together or in separate steps. If the base web is made from an aqueous suspension of fibers, the additives may be added during the wet end of the process of producing the paper or during the dry end. If the base web is made from an airlaid, spunlace, spunlaid, hydroentangled or meltblown process, additives could be introduced as is or as modified filler or fiber during the processing or after base web processing.

In one embodiment, the first additive is applied to the base web as a sizing treatment, while the second additive is applied to at least one surface of the base web while the base web is wet or after the base web has been dried. For instance, the first additive may be applied as an internal sizing agent or as a surface sizing agent. Internal sizing is the addition of the first additive to the aqueous suspension of fibers prior to forming the base web or paper. For instance, the first additive may be added to the papermaking pulp slurry prior to or in the headbox before the slurry is deposited onto a forming surface.

In an alternative embodiment, the first additive is applied as a surface size after the base web has been formed but prior to any significant drying. For instance, the first additive may be added to the paper web using bath sizing, using a size press, through spraying, through the use of a smoothing press, through the use of a gate roll size press, using calendar sizing, through blade coating, or the like. When using a size press to apply the first additive, the newly formed paper can be passed through rollers that press the first additive into the sheet and optionally remove excess additive or size.

There may be certain advantages to applying the first additive as a size or using a size press. For instance, the first additive can make the paper web more hydrophobic and/or can improve surface strength or water resistance. In this manner, the paper web may be more easily dewatered. Ultimately, the first additive may improve runability of the paper web on the papermaking machine while also improving surface strength and printability.

The second additive or polymer component on the other hand, may be applied typically to one surface of the base web or to both surfaces of the base web. The second additive can be applied to the base web while the web is wet or after the web has been dried. Any suitable technique may be used to apply the second additive to the base web. For instance, the second additive may be applied by size press, spraying, knife coating, Meyer rod coating, dusting, transfer roll coater or through any suitable printing process. Printing processes that may be used include flexographic printing, gravure printing, and the like. In one embodiment, the second additive may cover 100% of the surface area of one side of the base web or both sides of the base web.

In one embodiment, the second additive can be printed on one or both sides of the paper web in a pattern. The pattern may comprise alternating lines or alternating squares such as a checkerboard. In this manner, less additive is used to coat the paper while still retaining all the benefits. For instance, the second additive may be applied to one surface of the paper web so as to cover from about 10% to about 100% surface area of the web, such as from about 20% to about 90% of the surface area of the web, such as from about 40% to about 60% of the surface area of the web. In another embodiment, the second additive could be distributed in the thickness of the paper to increase reactive area.

When present, the third additive can be applied as a surface size or can be topically applied to the web after it has been formed and dried. In this regard, the third additive can be combined with the first additive and applied to the base web and/or may be combined with the second additive and applied to the base web. In still another embodiment, the third additive can be applied at a different point in time than either the first additive or the second additive.

As described above, in one embodiment, the base web or paper is formed from an aqueous suspension of fibers. The fibers may comprise wood pulp fibers, other plant fibers, synthetic fibers, modified or graft fibers or a mixture of fibers. In one embodiment, the paper is made from at least 70% by weight, such as at least 80% by weight, such as at least 90% by weight of pulp or plant fibers such as wood fibers or flax fibers. The fibers can have a length of from about 1 mm to about 20 mm such as from about 2 mm to about 7 mm.

The aqueous suspension of fibers is deposited onto a porous forming surface (a flat wire or an inclined wire) that allows water to drain thereby forming the base web. The forming surface and/or downstream fabrics can include a woven pattern that incorporates texture into the paper as it is being formed.

As the paper web is formed and dried, the paper can be gathered; crimped and/or embossed and gathered; crimped, corrugated, and gathered; or embossed, corrugated, and gathered to form a filter element. Specifically, the paper can be continuously gathered laterally into rod form and cut to a desired length.

The paper can be crimped or embossed and/or corrugated using various techniques. The corrugation pattern can vary and can have a wavy, square wave, or saw-tooth configuration. In one embodiment, the paper can be moistened prior to being embossed, crimped and/or corrugated.

In addition to paper webs containing primarily wood fibers or flax fibers, in an alternative embodiment, the paper web can be made or comprise tobacco compounds such as a reconstituted tobacco base sheet or reconstituted tobacco paper. In this embodiment, the paper can be formed from a tobacco furnish containing tobacco stems (e.g., flue-cured stems), fines, and/or other tobacco by-products from tobacco manufacturing processes. In forming the paper, the tobacco furnish is initially mixed with a solvent (e.g., water and/or other compounds) at elevated temperatures. For example, various solvents that are water-miscible, such as alcohols (e.g., ethanol), can be combined with water to form an aqueous solvent. The water content of the aqueous solvent can, in some instances, be greater than 50% by weight of the solvent, and particularly greater than 90% by weight of the solvent. Deionized water, distilled water or tap water may be employed. The amount of the solvent in the suspension can vary widely, but is generally added in an amount from about 75% to about 99% by weight of the suspension. However, the amount of solvent can vary with the nature of the solvent, the temperature at which the extraction is to be carried out, and the type of tobacco furnish.

After forming the solvent/tobacco furnish mixture, some or all of a soluble extracts fraction of the furnish mixture may be optionally separated (e.g., extracted) from the mixture. If desired, the aqueous solvent/tobacco furnish mixture can be agitated during extraction by stirring, shaking, or otherwise mixing the mixture in order to increase the rate of extraction. Typically, extraction is carried out for about 0.5 hours to about 6 hours. Moreover, although not required, typical extraction temperatures range from about 10° C. to about 100° C.

Once separated from the insoluble residue fraction of the tobacco solution, the soluble extracts fraction can optionally be concentrated using any known type of concentrator, such as a vacuum evaporator. In one embodiment, the soluble component may be highly concentrated.

Once extracted, the insoluble residue fraction can optionally be subjected to one or more mechanical refiners to produce a fibrous pulp. Some examples of suitable refiners can include disc refiners, conical refiners, and the like.

The soluble extracts fraction can be utilized in any manner desired. In one embodiment, the soluble extracts fraction may be recombined with the insoluble residue fraction. For example, the soluble extracts fraction can be recombined with the insoluble residue fraction to form the reconstituted tobacco sheet or paper. Specifically, the soluble extracts fraction can be reapplied to the sheet, tobacco blend, insoluble residue, etc., using various application methods, such as spraying, using sizing rollers, saturating, and the like. In one embodiment, the insoluble residue fraction may be in the form of a pulp that is then transferred to a papermaking station that includes a forming apparatus, which may include, for example, a forming wire, gravity drain, suction drain, felt press, Yankee dryer, drum dryers, etc. In such a forming apparatus, the pulp is laid onto a wire belt forming a sheet-like shape and excess water is removed by the gravity drain and suction drain and presses. Thereafter, the soluble extracts fraction may be reapplied to the insoluble residue fraction. When the insoluble residue fraction is recombined with the soluble extracts fraction, the resulting tobacco product is generally known as "reconstituted tobacco."

Reconstituted tobacco can generally be formed in a variety of ways. For instance, in one embodiment, band casting or extrusion can be utilized to form the reconstituted tobacco. Band casting typically employs a slurry of finely divided tobacco parts and a binder that is coated onto a steel band and then dried. Some examples of processes for producing reconstituted tobacco are described in U.S. Pat. Nos. 3,353,541; 3,420,241; 3,386,449; 3,760,815; and 4,674,519; which are incorporated herein by reference thereto. Reconstituted tobacco can also be formed by a papermaking process. Some examples of processes for forming reconstituted tobacco according to this process are described in U.S. Pat. Nos. 3,428,053; 3,415,253; 3,561,451; 3,467,109; 3,483,874; 3,860,012; 3,847,164; 4,182,349; 5,715,844; 5,724,998; and 5,765,570; which are also incorporated herein by reference. For example, the formation of reconstituted tobacco using papermaking techniques can involve the steps of mixing tobacco with water, extracting the soluble ingredients therefrom, concentrating the soluble ingredients, refining the tobacco, forming a web, reapplying the concentrated soluble ingredients, and drying.

In one embodiment, the tobacco soluble extracts fraction is recombined with the tobacco material such that the resulting reconstituted tobacco contains greater than about 10%, such as greater than about 15%, such as greater than about 20%, such greater than about 30%, such as greater than about 35%, such as greater than about 40%, such as greater than about 45% of tobacco solubles. The reconstituted tobacco generally contains less than about 50%, such as less than about 45% of tobacco solubles.

When used in a smoking article, filter elements made in accordance with the present disclosure can generally have a circumference of from about 15 mm to about 30 mm, such as from about 15 mm to about 25 mm.

The resulting paper can have a basis weight of greater than about 15 gsm, such as greater than about 25 gsm, such as greater than about 35 gsm, such as greater than about 45 gsm, such as greater than about 55 gsm, such as greater than about 65 gsm, such as greater than about 75 gsm, such as greater than about 85 gsm, such as greater than about 95 gsm, such as greater than about 105 gsm, such as greater than about 115 gsm. The paper generally has a basis weight of less than about 200 gsm, such as less than about 150 gsm, such as less than about 100 gsm. In one embodiment, the basis weight can be from about 15 gsm to about 50 gsm, such as from about 15 gsm to about 40 gsm.

Figure 2:
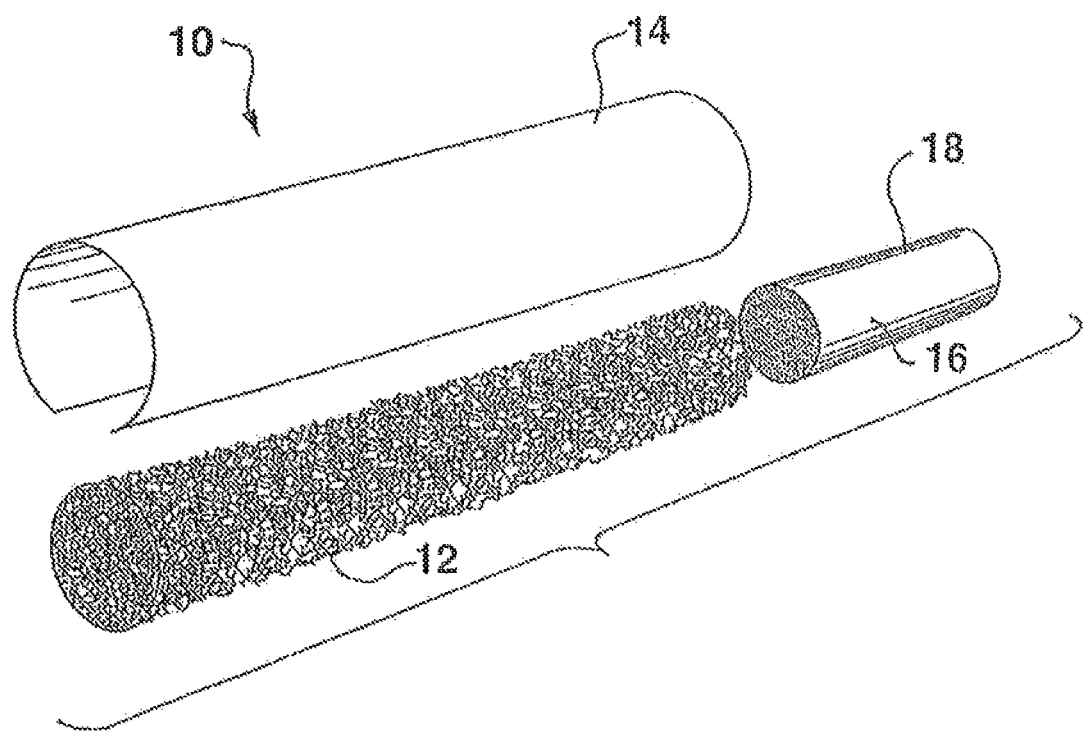
FIG. 2 is a perspective view illustrating the different components used to make a cigarette.

Referring now to FIGS. 1 and 2, one embodiment of a smoking article is illustrated for purposes of explanation. The smoking article illustrated in FIGS. 1 and 2 comprises a cigarette although other smoking articles can incorporate filter elements made in accordance with the present disclosure. The smoking article 10 includes a tobacco column 12 within a wrapper 14. The wrapper 14 defines an outer circumferential surface when wrapped around the tobacco column 12.

The smoking article 10 may also include a filter 16 that may be made from the filter element of the present disclosure. The filter 16 can optionally be held in cylindrical form by a plug wrap paper. The filter 16 is attached to the tobacco column 12 using a tipping paper 18 and an adhesive.

Different air permeability levels of the wrapper 14 and the tipping paper 18 contribute to the control of the burn rate and other physical characteristics of the smoking article.

The smokable material contained in the tobacco rod 12 can vary. The smokable material can have the form of a filler which includes tobacco materials and other smokable materials which have a form suitable for use in the manufacture of tobacco rods for cigarettes. The filler material typically comprises strands or shreds of tobacco materials. Examples of suitable types of tobacco materials include flue-cured, Burley, or Oriental tobaccos, the rare or specialty tobaccos, and blends thereof. The tobacco material can be provided in the form of tobacco lamina; processed tobacco materials such as volume expanded or puffed tobacco; processed tobacco stems such as cut-rolled or cut puffed stems; reconstituted tobacco material; or blends thereof.

In one embodiment, the tobacco column 12 is comprised of a Flue-cured or American tobacco blend.

Typically the tobacco rod has a length which ranges from about 55 mm to about 85 mm, preferably about 60 mm to about 70 mm; and a circumference of about 15 mm to about 27 mm, preferably about 15 mm to about 25 mm.

The packing densities of the blend of smokable materials contained within the wrapping materials can vary. Typical packing densities for tobacco rods of cigarettes range from about 150 to about 400 mg/cm$^3$, preferably about 150 to 250 mg/cm$^3$.

Typically, the filter has a length which ranges from about 15 mm to about 40 mm, such as from about 20 mm to about 30 mm.

The filter can be comprised of a single segment made from the paper of the present disclosure or can include multiple segments. When made from multiple segments, one segment may contain the paper and/or reconstituted tobacco of the present disclosure while another segment may contain another material, such as cellulose acetate.

The treated paper of the present disclosure can be used in other numerous and diverse applications in addition to being incorporated into a filter for a smoking article. For instance, the filter media of the present disclosure can be used in any application for filtering an aerosol. The filter media, for instance, may be used in automobile exhaust or air filtration systems. The paper media may also be used as a tea pouch to remove polyphenols bitterness and astringency or may be used to produce coffee paper filter. In still another embodiment, the paper may be used as a pouch for snuff tobacco. In still another embodiment, the treated paper of the present disclosure may be used as plug wrap paper. The plug wrap paper may be wrapped around a filter for a smoking article for holding the filter together prior to attachment to the smoking article using a tipping paper.

Example 1

Paper filters treated with a first and second additive according to the foregoing description deliver less HCN, phenol, and cresols than untreated paper filters. Also, there is no significant difference between tar, nicotine and CO deliveries by paper filters treated with a first and second additive according to the foregoing description and tar, nicotine and CO deliveries by untreated paper filters.

Cigarette samples were prepared in order to test the filtering performance of paper filters treated with additives according to the foregoing description versus the filtering performance of untreated paper filters. The cigarette samples were assembled with one flue cured tobacco rod each and one filter each. The filter of Sample 1 was composed of paper treated with a first additive comprised of a sizing agent comprised of alkyl ketene dimer (AKD) and a second additive comprised of polyethylene glycol (PEG) (MW greater than 550 g/mol). The filter in Sample 1 contained the sizing agent in an amount of 6% by weight of the base web and contained PEG in an amount of 15% by weight of the base web. The filter in Sample 2 and the filter in Sample 3 were both composed of paper treated with a first additive comprised of a sizing agent comprised of alkenyl ketene dimer (AKD-2) and a second additive comprised of PEG. The filter in Sample 2 and the filter in Sample 3 both contained AKD-2 in an amount of 7% by weight of the base web. The filter in Sample 2 contained PEG in an amount of 15% by weight of the base web, and the filter in Sample 3 contained PEG in an amount of 21% by weight of the base web. The filter in Sample 4 was an untreated paper filter, and Sample 4 was used as a standard of comparison for Samples 1-3. The cigarette samples each had a length of 84 mm, a tipping length of 32 mm, and a filter length of 24 mm. Cigarette Samples 1, 2, 3, and 4 weighed 1000 mg, 1012 mg, 1022 mg, and 1004 mg, respectively. The cigarette samples were smoked on a Borgwaldt RM20 kit smoking machine with an ISO smoking regime. The resulting smoke deliveries per cigarette are recorded in Table 1 below, and the resulting delivery of carbonyls, phenols, and HCN per cigarette sample is recorded in Table 2 below. Carbonyls, phenols and HCN were analyzed with an ISO smoking regime. FIGS. 3-6 are visualizations of the data in Tables 1 and 2.

TABLE 1

| Smoke delivery (mg) per Cigarette | | | | | | | | |
|---|---|---|---|---|---|---|---|---|
| | Sample 1 | | Sample 2 | | Sample 3 | | Sample 4 | |
| Tar | 6.6 | +/−0.3 | 6.3 | +/−1.2 | 6.5 | +/−0.8 | 6.9 | +/−1.2 |
| Nicotine | 0.56 | +/−0.02 | 0.57 | +/−0.08 | 0.58 | +/−0.03 | 0.59 | +/−0.06 |
| Water | 0.4 | +/−0.1 | 0.8 | +/−0.7 | 0.7 | +/−0.4 | 0.6 | +/−0.4 |
| CO | 13.1 | +/−1.0 | 13.3 | +/−0.1 | 13.2 | +/−1.5 | 13.4 | +/−1.4 |

+/−: Confidence interval at 95%

TABLE 2

| | | Delivery of Carbonyls, Phenols, & HCN (μg) per Cigarette | | | | | | | |
|---|---|---|---|---|---|---|---|---|---|
| | | Sample 1 | | Sample 2 | | Sample 3 | | Sample 4 | |
| Carbonyls | Formaldehyde | 62.8 | +/−7.6 | 63.0 | +/−14.8 | 67.3 | +/−1.8 | 52.5 | +/−16.7 |
| | Acetaldehyde | 677.6 | +/−28.3 | 682.6 | +/−28.6 | 662.1 | +/−43.1 | 698.4 | +/−74.7 |
| | Acetone | 281.6 | +/−12.7 | 280.5 | +/−13.5 | 269.4 | +/−20.9 | 295.3 | +/−11.1 |
| | Acroleine | 77.0 | +/−1.1 | 77.3 | +/−2.3 | 73.8 | +/−7.3 | 83.0 | +/−11.4 |
| | Propionaldehyde | 55.0 | +/−1.8 | 55.6 | +/−1.6 | 53.7 | +/−3.3 | 55.0 | +/−5.1 |
| | Crotonaldehyde | 19.6 | +/−0.6 | 20.1 | +/−1.4 | 18.0 | +/−2.7 | 20.7 | +/−2.1 |
| | Butanone | 80.5 | +/−3.1 | 78.6 | +/−4.3 | 74.6 | +/−3.9 | 84.2 | +/−1.1 |
| | Butyraldehyde | 41.4 | +/−0.6 | 42.6 | +/−2.2 | 39.6 | +/−1.7 | 44.5 | +/−5.3 |
| Phenols | Hydroquinone | 31.4 | +/−1.7 | 30.9 | +/−4.1 | 33.4 | +/−2.1 | 26.6 | +/−1.7 |
| | Catechol | 36.1 | +/−8.2 | 38.9 | +/−2.7 | 40.6 | +/−2.8 | 35.2 | +/−3.4 |
| | Phenol | 4.6 | +/−0.8 | 4.4 | +/−1.2 | 3.4 | +/−1.3 | 16.4 | +/−1.9 |
| | m + p Cresols | 4.3 | +/−0.6 | 4.0 | +/−0.6 | 3.5 | +/−0.7 | 10.4 | +/−1.2 |
| | o-Cresol | 1.1 | +/−0.6 | <1.07 | | <1.07 | | 3.8 | +/−0.5 |
| HCN | Impinger HCN | 54.8 | +/−12.8 | 46.7 | +/−7.9 | 36.7 | +/−2.7 | 79.8 | +/−8.1 |
| | Pad HCN | 53.2 | +/−9.4 | 49.3 | +/−4.6 | 40.6 | +/−5.4 | 61.6 | +/−6.7 |
| | Total HCN | 108.0 | +/−22.1 | 95.9 | +/−10.7 | 77.3 | +/−5.8 | 141.3 | +/−14.7 |

Samples 1, 2, 3, and 4 exhibited similar standard pressure drops of 163, 157, 159, and 160 mm WG, respectively.

Figure 3:
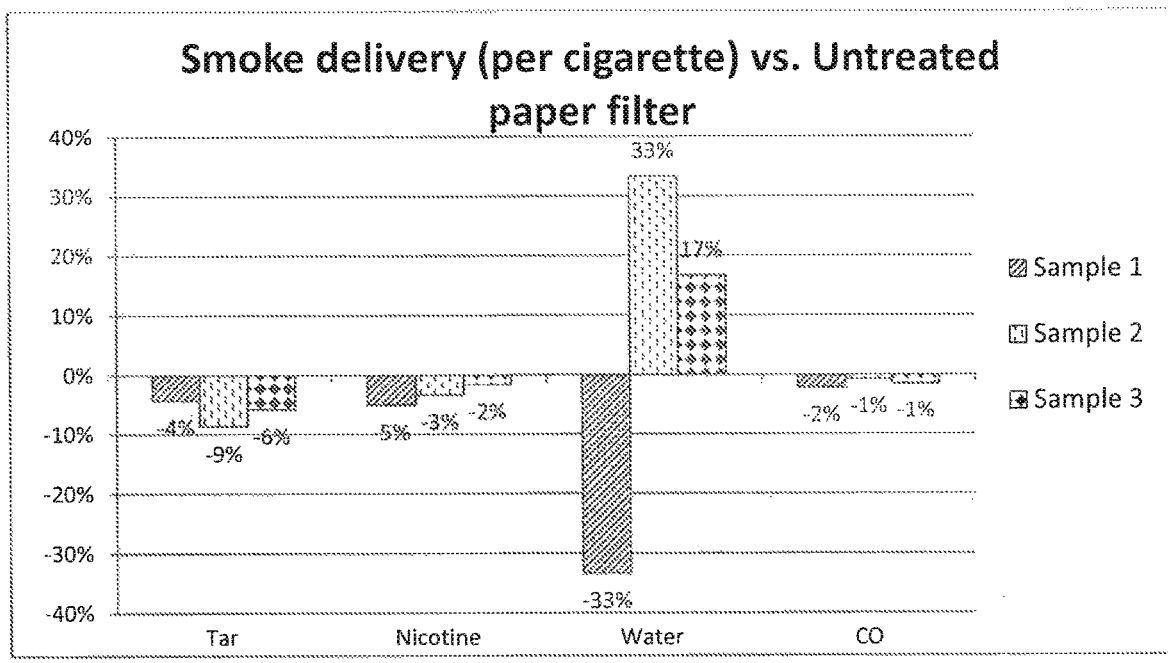
FIGS. 3-13 are graphical representations of the results obtained in the examples below.

As illustrated in Table 1 and FIG. 3, tar, nicotine and CO deliveries by paper filters treated with additives according to the foregoing description are not significantly different than tar, nicotine and CO deliveries by untreated paper filters. For example, there is no significant difference, considering the 95% confidence interval, between smoke deliveries by the filter in Sample 1, which was treated with AKD and PEG, or the filters in Samples 2 and 3, which were treated with AKD-2 and PEG, and smoke deliveries by the untreated filter in Sample 4.

Figure 4:
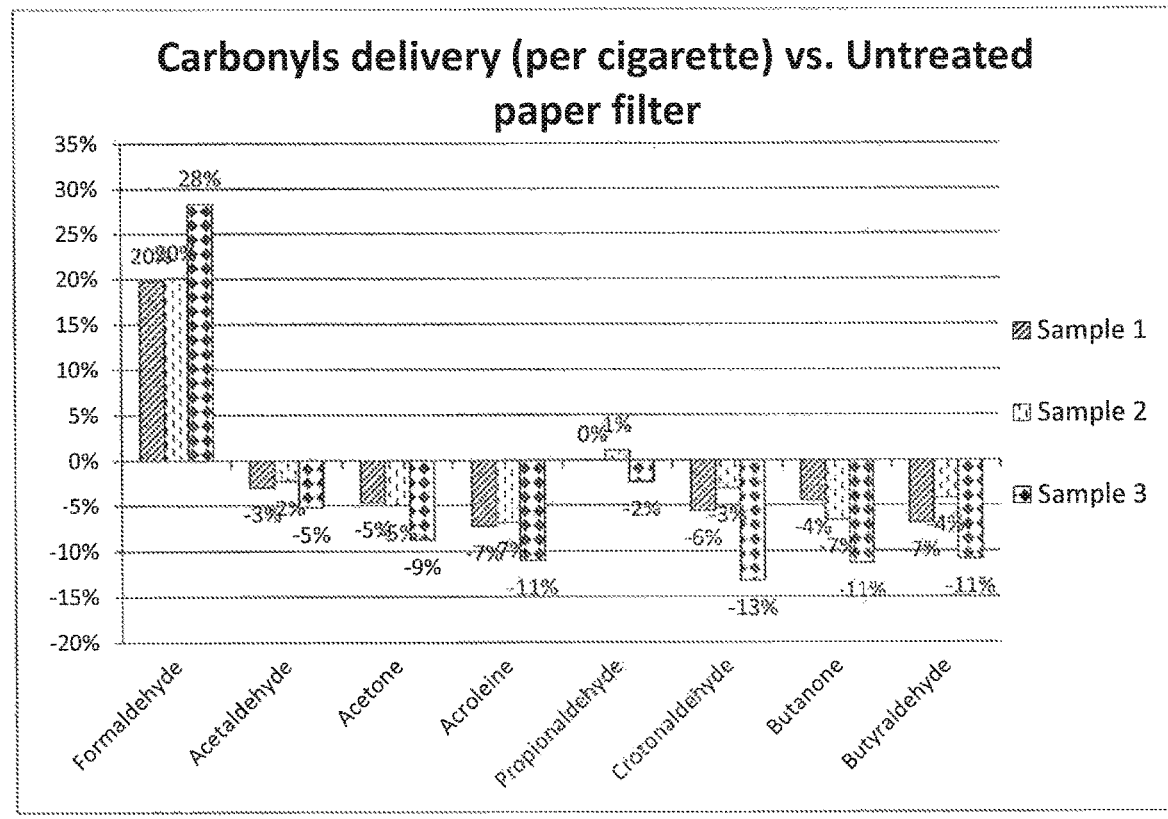

As illustrated in Table 2 and FIG. 4, delivery of carbonyls by paper filters treated with additives according to the foregoing description is either not significantly different or is significantly less than delivery of carbonyls by untreated paper filters. For example, the delivery of butanone by the filter in Sample 1, which was treated with AKD and PEG, and the delivery of butanone by the filters in Samples 2 and 3, which were treated with AKD-2 and PEG, are significantly less, considering the 95% confidence interval, than the delivery of butanone by the untreated filter in Sample 4. Except for butanone, there is no significant difference between the delivery of carbonyls by the filters in Samples 1-3, which were treated with additives according to the foregoing description, and the delivery of carbonyls by the untreated filter in Sample 4.

Figure 5:
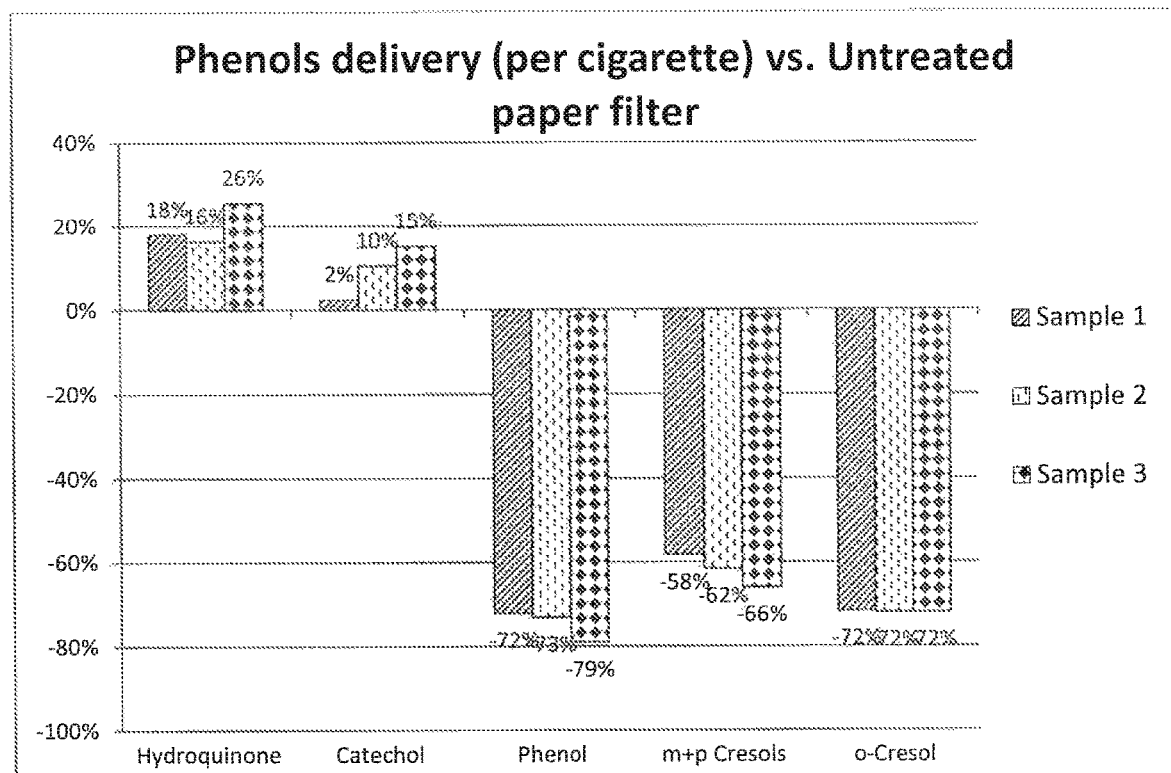

As illustrated in Table 2 and FIG. 5, delivery of phenol and cresols by paper filters treated with additives according to the foregoing description is significantly less than delivery of phenol and cresols by untreated paper filters. For example, the delivery of phenol and cresols by the filter in Sample 1, which was treated with AKD and PEG, and the delivery of phenol and cresols by the filters in Samples 2 and 3, which were treated with AKD-2 and PEG, are significantly less, considering the 95% confidence interval, than the delivery of phenol and cresols by the untreated filter in Sample 4. Further, the delivery of phenol and m+p cresols by the filter in Sample 3, which contained PEG in an amount of 21% by weight of the base web, was less than the delivery of phenol and m+p cresols by the filters in Samples 1 and 2, which each contained PEG in an amount of 15% by weight of the base web.

Figure 6:
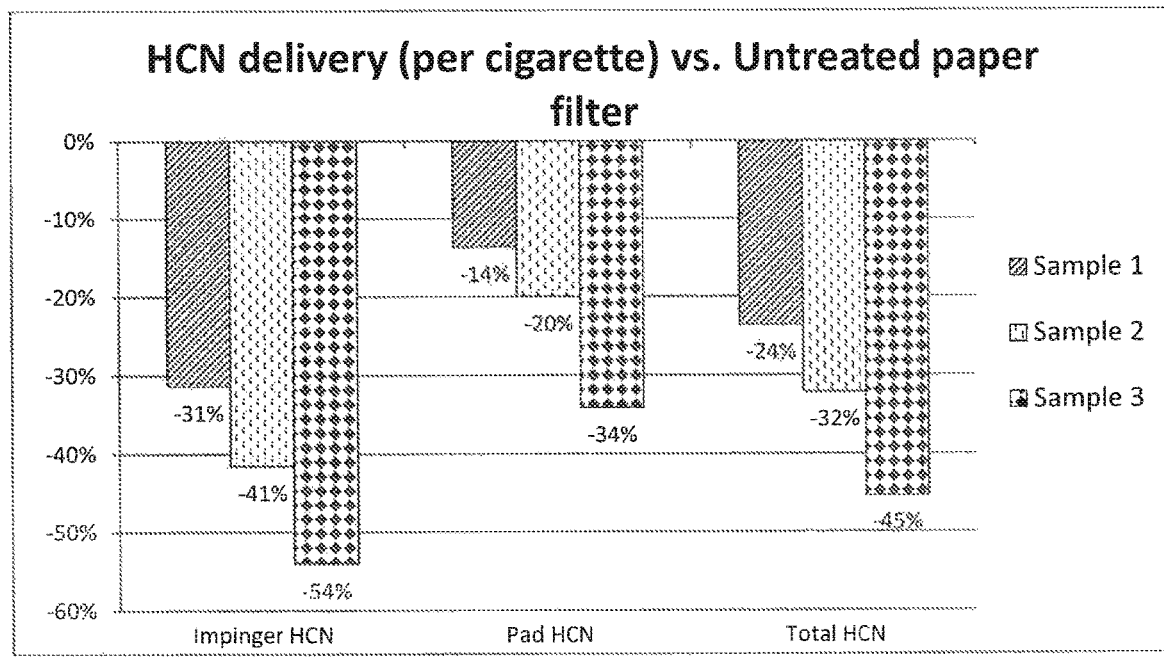

As illustrated in Table 2 and FIG. 6, delivery of HON by paper filters treated with additives according to the foregoing description is significantly less than delivery of HCN by untreated paper filters. For example, the delivery of HCN by the filter in Sample 1, which was treated with AKD and PEG, and the delivery of HON by the filters in Samples 2 and 3, which were treated with AKD-2 and PEG, are significantly less (24% to 45% less), considering the 95% confidence interval, than the delivery of HCN by the untreated filter in Sample 4. Further, the delivery of HCN by the filter in Sample 3, which contained PEG in an amount of 21% by weight of the base web, was less than the delivery of HON by the filters in Samples 1 and 2, which each contained PEG in an amount of 15% by weight of the base web.

Example 2

Figure 7:
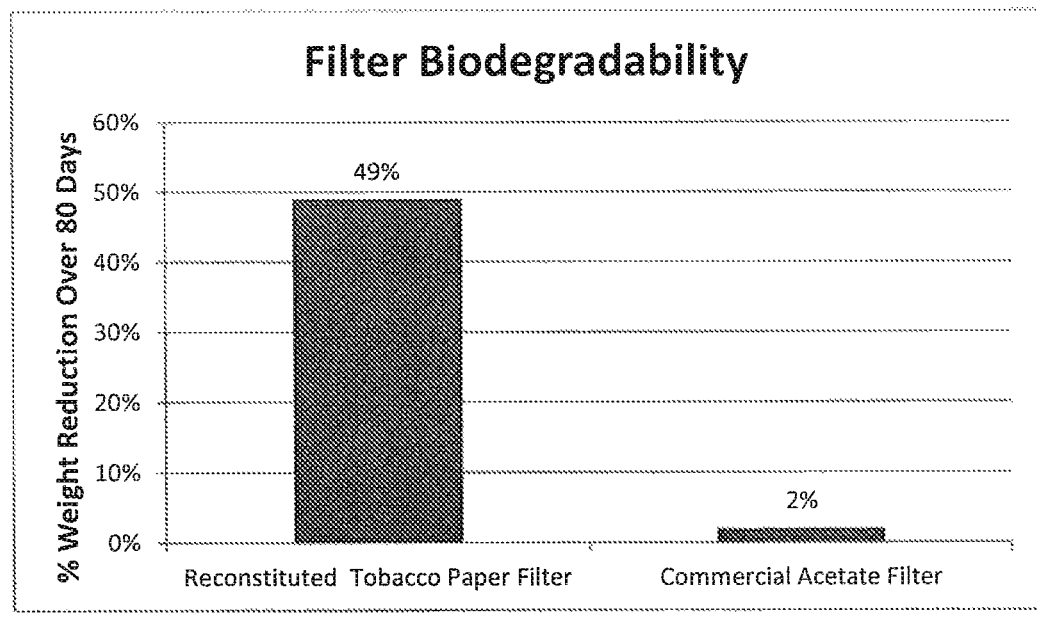

Reconstituted tobacco paper filters biodegrade at a faster rate than commercial cellulose acetate filters. This was demonstrated by testing the biodegradability of a reconstituted tobacco paper filter against the biodegradability of commercial cellulose acetate filter. As illustrated in FIG. 7, the reconstituted tobacco paper filter exhibited a weight reduction of 49% over 80 days compared with a weight reduction of 2% by the commercial cellulose acetate filter over the same period.

Figure 8:
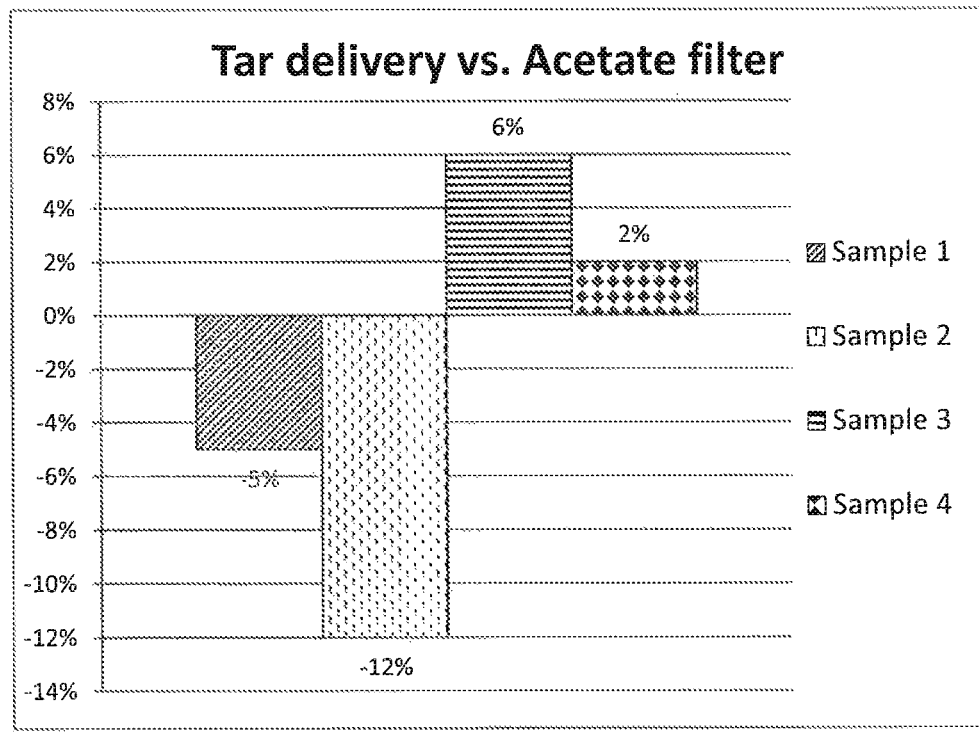
Figure 9:
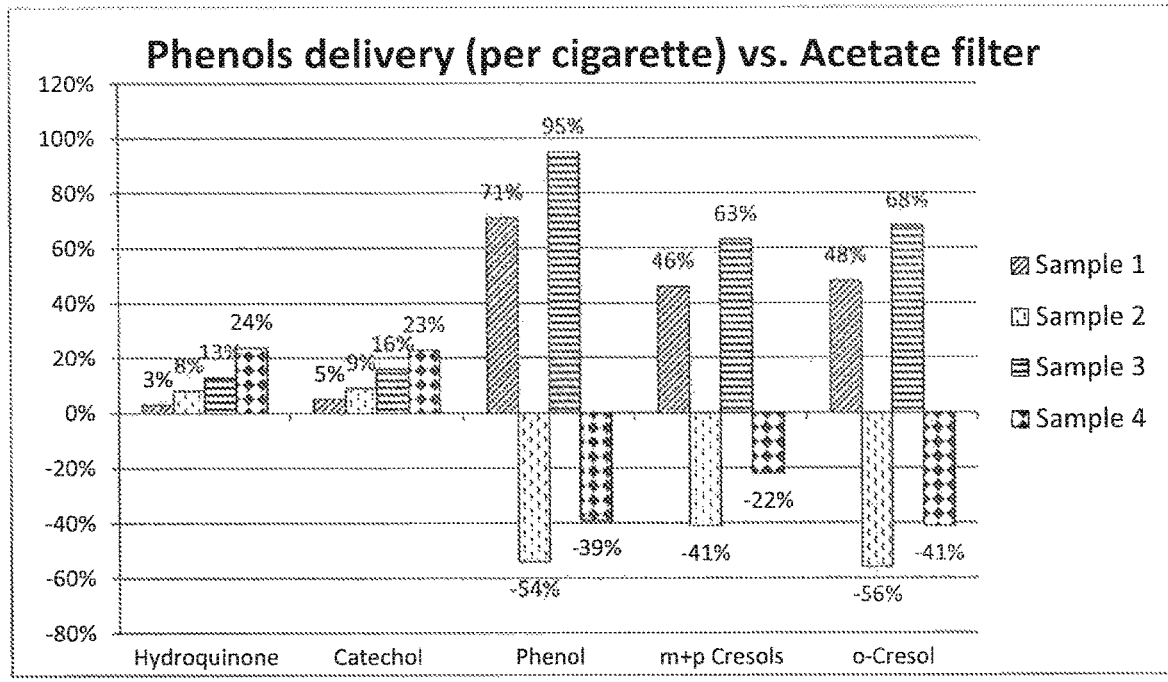
Figure 10:
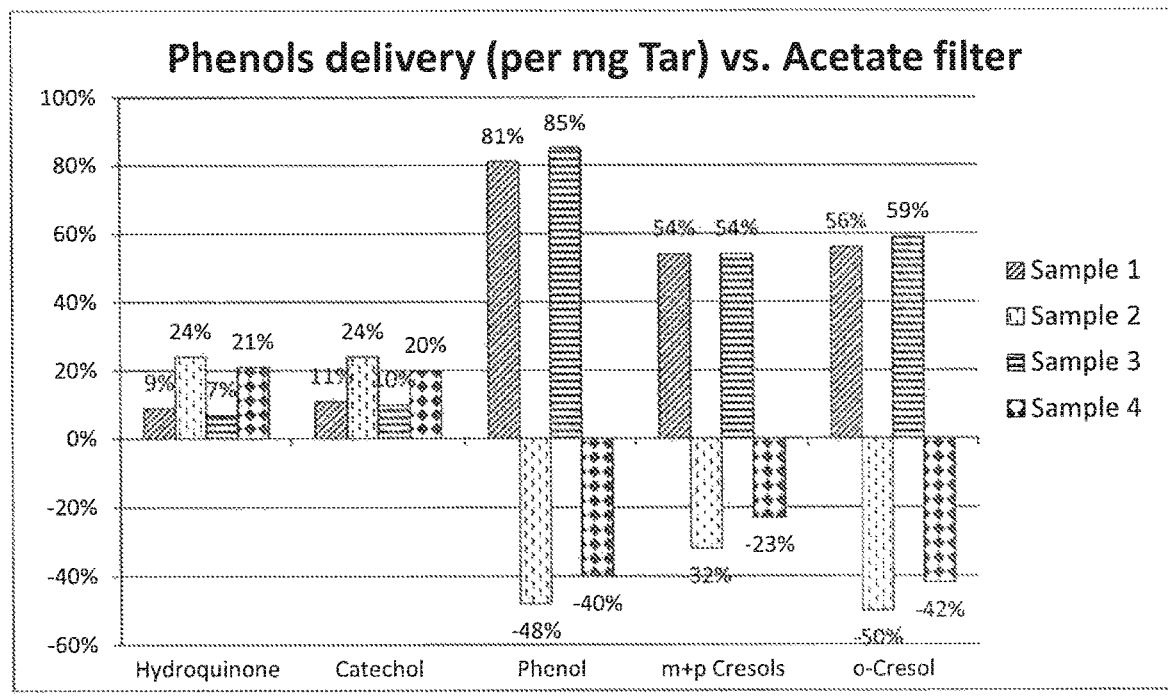
Figure 11:
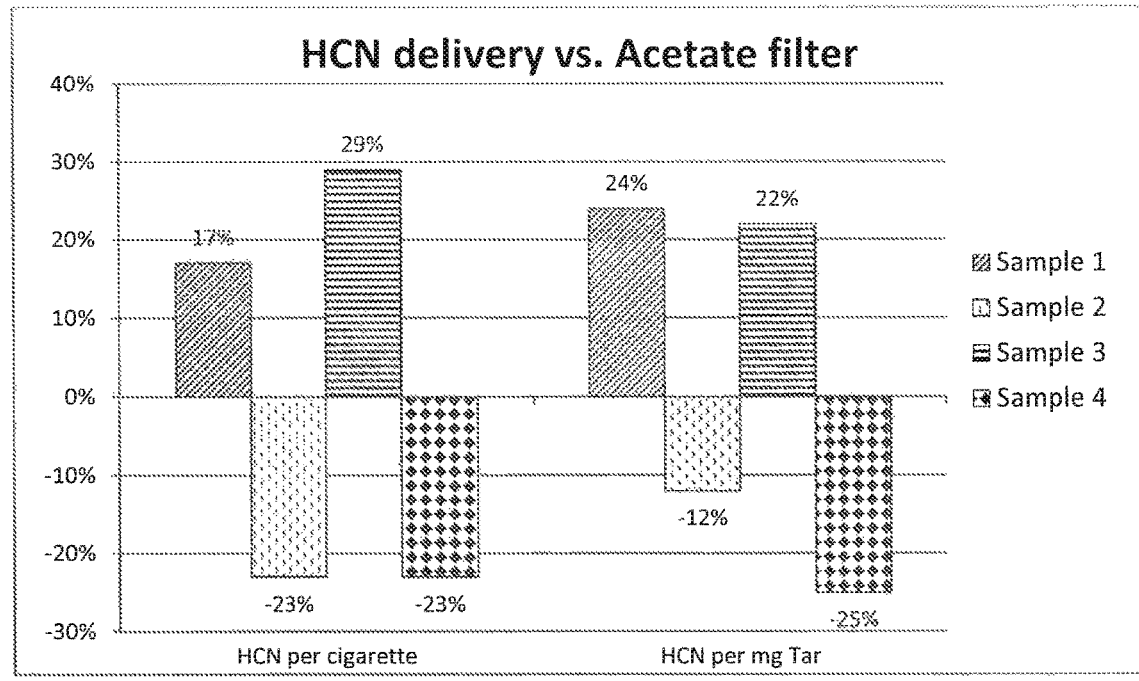

Compared with commercial cellulose acetate filters, reconstituted tobacco base paper filters with or without additives can reduce delivery of tar as illustrated in FIG. 8, reconstituted tobacco base paper filter and reconstituted tobacco paper filter treated with additives according to the foregoing description can reduce delivery of phenols per cigarette, phenols per milligram of tar, HON per cigarette and HCN per milligram of tar as illustrated in FIGS. 9, 10, and 11, respectively. Cigarette samples were prepared in order to test the filtering performance of reconstituted tobacco paper filters treated with additives according to the foregoing description versus the filtering performance of cellulose acetate filters. The cigarette samples were assembled with one flue cured tobacco rod each and one filter each. The filter in Sample 1 was composed of reconstituted tobacco base paper grade A. The filter in Sample 2 was composed of reconstituted tobacco base paper grade A treated with a first additive comprised of a sizing agent comprised of alkyl ketene dimer (AKD) and a second additive comprised of polyethylene glycol (PEG). The filter in Sample 3 was composed of reconstituted tobacco paper grade B. The filter in Sample 4 was composed of reconstituted tobacco paper grade B treated with a first additive comprised of a sizing agent comprised of AKD and a second additive comprised of PEG. The filter in Sample 2 and the filter in Sample 4 both contained sizing agent in an amount of 7% by weight of the base web and PEG in an amount of 20% by weight of the base web. The filter in Sample 5 was a commercial cellulose acetate filter, and Sample 5 was used as a standard of comparison for Samples 1-4. The cigarette samples each had a length of 84 mm, a tipping length of 32 mm, and a filter length of 24 mm. Cigarette Samples 1, 2, 3, 4, and 5 weighed 1070 mg, 1061 mg, 1205 mg, 1205 mg, and 949 mg, respectively. The cigarette samples were smoked on a Borgwaldt RM20 kit smoking machine, and the resulting delivery of tar, phenols, and HCN per cigarette sample with an ISO smoking regime is recorded in Table 3 below. The delivery of phenols and HCN per milligram of tar for each cigarette sample is recorded in Table 4 below. FIGS. 8-11 are visualizations of the data in Tables 3 and 4.

TABLE 3

| | Delivery per Cigarette | | | | | | | | | |
|---|---|---|---|---|---|---|---|---|---|---|
| | Sample 1 | | Sample 2 | | Sample 3 | | Sample 4 | | Sample 5 | |
| Tar (mg) | 11.4 | +/−0.4 | 10.6 | +/−0.5 | 12.7 | +/−0.6 | 12.3 | +/−0.4 | 12.0 | +/−0.8 |
| Hydroquinone (μg) | 48.7 | +/−5.0 | 51.2 | +/−6.1 | 53.4 | +/−8.9 | 58.4 | +/−6.6 | 47.2 | +/−1.1 |
| Catechol (μg) | 79.2 | +/−8.5 | 81.8 | +/−7.7 | 87.4 | +/−11.7 | 92.5 | +/−11.0 | 75.1 | +/−6.2 |
| Phenol (μg) | 31.6 | +/−4.4 | 8.4 | +/−2.0 | 36.0 | +/−2.3 | 11.3 | +/−1.7 | 18.4 | +/−3.7 |

TABLE 3-continued

| | Delivery per Cigarette | | | | | | | | | |
|---|---|---|---|---|---|---|---|---|---|---|
| | Sample 1 | | Sample 2 | | Sample 3 | | Sample 4 | | Sample 5 | |
| m + p cresols (µg) | 18.4 | +/−2.5 | 7.5 | +/−1.0 | 20.4 | +/−0.8 | 9.8 | +/−1.4 | 12.6 | +/−1.9 |
| o-cresol (µg) | 6.7 | +/−0.8 | 2.0 | +/−0.6 | 7.6 | +/−0.5 | 2.7 | +/−0.1 | 4.6 | +/−0.7 |
| HCN (µg) | 167.0 | | 110.0 | | 184.0 | | 110.0 | | 142.0 | |

TABLE 4

| | Delivery (µg) per mg Tar | | | | |
|---|---|---|---|---|---|
| | Sample 1 | Sample 2 | Sample 3 | Sample 4 | Sample 5 |
| Hydroquinone | 4.3 | 4.8 | 4.2 | 4.7 | 3.9 |
| Catechol | 6.9 | 7.7 | 6.9 | 7.5 | 6.2 |
| Phenol | 2.8 | 0.8 | 2.8 | 0.9 | 1.5 |
| m + p cresols | 1.6 | 0.7 | 1.6 | 0.8 | 1.0 |
| o-cresol | 0.6 | 0.2 | 0.6 | 0.2 | 0.4 |
| HCN | 14.6 | 10.4 | 14.5 | 8.9 | 11.8 |

Samples 1, 2, 3, 4, and 5 exhibited similar standard pressure drops of 120, 123, 118, 119, and 119 mm WG, respectively.

As illustrated in Table 3 and FIG. 8, tar delivery by a reconstituted tobacco paper filter is reduced if such a filter is treated with a first and second additive according to the foregoing description. For example, the delivery of tar by the filter in Sample 2, which was treated with AKD and PEG, was less than the delivery of tar by the filter in Sample 1, which was not treated with AKD and PEG additives. Similarly, the delivery of tar by the filter in Sample 4, which was treated with AKD and PEG, was less than the delivery of tar by the filter in Sample 3, which was not treated with AKD or PEG additives. Also, the filters in Samples 1 and 2 reduced tar delivery by 5% and 12%, respectively, compared with commercial cellulose acetate filters.

As illustrated in Table 3, Table 4, FIG. 9, and FIG. 10, delivery of phenols by a reconstituted tobacco paper filter treated with a first and second additive according to the foregoing description is less than the delivery of phenols by commercial cellulose acetate filters. For example, the filter in Sample 2, which was treated with AKD and PEG, resulted in 54% less phenol delivery per cigarette and 48% less phenol delivery per milligram of tar than commercial cellulose acetate filters. Similarly, the filter in Sample 4, which was treated with AKD and PEG, resulted in 39% less phenol delivery per cigarette and 40% less phenol delivery per milligram of tar than commercial cellulose acetate filters.

As illustrated in Table 3, Table 4, and FIG. 11, delivery of HCN by a reconstituted tobacco paper filter treated with a first and second additive according to the foregoing description is less than the delivery of HCN by commercial cellulose acetate filters. For example, the filter in Sample 2, which was treated with AKD and PEG, resulted in 23% less HCN delivery per cigarette and 12% less HCN delivery per milligram of tar than commercial cellulose acetate filters. Similarly, the filter in Sample 4, which was treated with AKD and PEG, resulted in 23% less HCN delivery per cigarette and 25% less HCN delivery per milligram of tar than commercial cellulose acetate filters.

Example 3

Compared with untreated paper filters, paper filters treated with a first additive, a second additive, and sodium glycinate according to the foregoing description can significantly reduce delivery of carbonyls while not significantly impacting tar and CO deliveries. Further, paper filters treated with a first additive, a second additive, and sodium glycinate according to the foregoing description delivered less of most analyzed carbonyls than paper filters treated with a first and second additive (but not sodium glycinate) according to the foregoing description.

Figure 12:
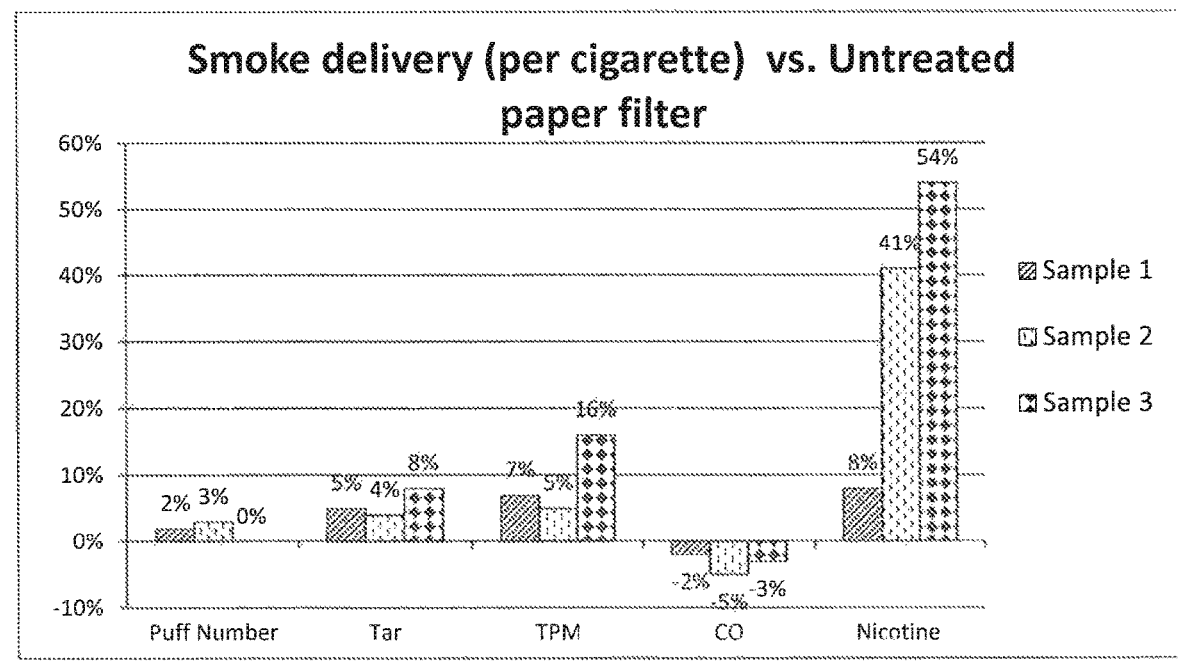
Figure 13:
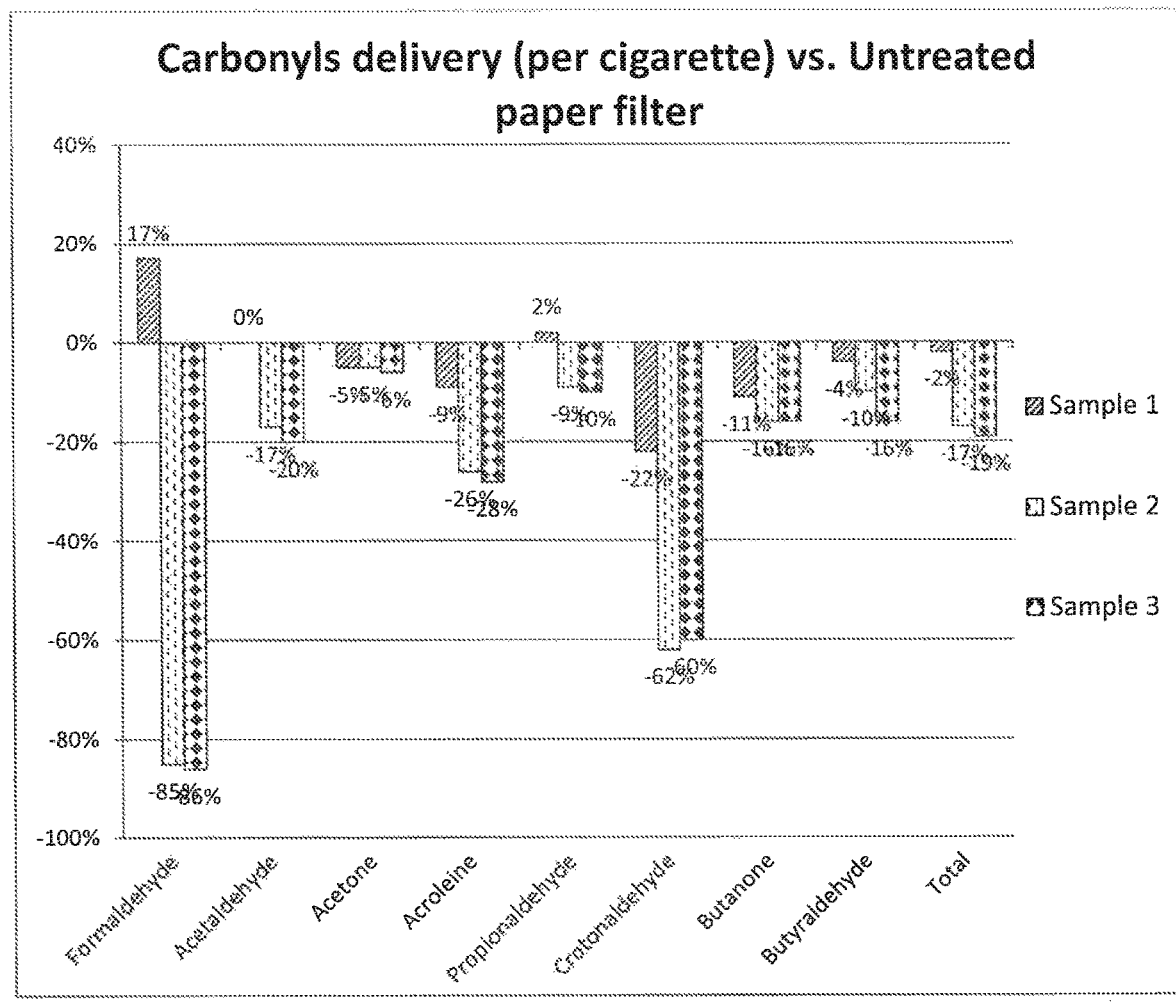

Cigarette samples were prepared in order to test the filtering performance of paper filters treated with a first additive, a second additive, and sodium glycinate according to the foregoing description versus the filtering performance of paper filters treated with a first and second additive (but not sodium glycinate) according to the foregoing description and versus the filtering performance of untreated paper filters. The cigarette samples were assembled with one flue-cured tobacco rod each and one filter each. The filter in Sample 1 was composed of paper treated with a first additive comprised of a sizing agent comprised of alkenyl ketene dimer (AKD-2) and a second additive comprised of polyethylene glycol (PEG). The filter in Sample 2 was composed of paper treated with a first additive comprised of a sizing agent comprised of AKD-2, a second additive comprised of PEG, and sodium glycinate. The filter in Sample 3 was composed of paper treated with a first additive comprised of a sizing agent comprised of AKD-2, a second additive comprised of PEG, and sodium glycinate. Samples 1, 2, and 3 all contained sizing agent in an amount of 7% by weight of the base web. Samples 1, 2, and 3 contained PEG in amounts of 18% by weight of the base web. Samples 2 and 3 contained sodium glycinate in amounts of 18% by weight of the base web. The filter in Sample 4 was an untreated paper filter, and Sample 4 was used as a standard of comparison for Samples 1-3. The cigarette samples each had a length of 84 mm, a tipping length of 32 mm, and a filter length of 24 mm. Cigarette Samples 1, 2, 3, and 4 weighed 1034 mg, 1084 mg, 1075 mg, and 1015 mg, respectively. The cigarette samples were smoked on a Borgwaldt RM20 kit smoking machine. The resulting smoke deliveries per cigarette are recorded in Table 5 below, and the resulting delivery of carbonyls per cigarette sample is recorded in Table 6 below. Carbonyls were analyzed with an ISO smoking regime. FIGS. 12 and 13 are visualizations of the data in Tables 5 and 6.

TABLE 5

Smoke delivery per Cigarette

|  | Sample 1 | | Sample 2 | | Sample 3 | | Sample 4 | |
| --- | --- | --- | --- | --- | --- | --- | --- | --- |
| Puff Number | 7.5 | +/−0.2 | 7.7 | +/−0.2 | 7.4 | +/−0.2 | 7.4 | +/−0.4 |
| Tar (mg/cig) | 7.3 | +/−0.4 | 7.1 | +/−0.7 | 7.4 | +/−0.2 | 6.9 | +/−0.8 |
| TPM (mg/cig) | 7.5 | +/−0.2 | 8.5 | +/−0.2 | 9.4 | +/−0.9 | 8.1 | +/−0.8 |
| CO (mg/cig) | 13.5 | +/−0.5 | 13.2 | +/−0.8 | 13.4 | +/−0.3 | 13.8 | +/−0.4 |
| Nicotine (mg/cig) | 0.63 | +/−0.06 | 0.80 | +/−0.04 | 0.90 | +/−0.08 | 0.58 | +/−0.08 |

TABLE 6

Delivery of Carbonyls (μg) per Cigarette

|  | Sample 1 | | Sample 2 | | Sample 3 | | Sample 4 | |
| --- | --- | --- | --- | --- | --- | --- | --- | --- |
| Formaldehyde | 56.0 | +/−0.6 | 7.0 | +/−0.8 | 7.0 | +/−1.3 | 48.0 | +/−12.4 |
| Acetaldehyde | 652.0 | +/−65.0 | 542.0 | +/−17.1 | 525.0 | +/−25.0 | 654.0 | +/−16.4 |
| Acetone | 273.0 | +/−15.4 | 273.0 | +/−22.0 | 270.0 | +/−14.8 | 286.0 | +/−9.1 |
| Acroleine | 72.0 | +/−2.1 | 58.0 | +/−1.2 | 57.0 | +/−4.4 | 79.0 | +/−2.3 |
| Propionaldehyde | 46.0 | +/−5.9 | 41.0 | +/−2.5 | 41.0 | +/−1.4 | 45.0 | +/−1.1 |
| Crotonaldehyde | 14.0 | +/−1.4 | 7.0 | +/−1.2 | 7.0 | +/−0.3 | 18.0 | +/−0.5 |
| Butanone | 53.0 | +/−5.1 | 50.0 | +/−5.2 | 50.0 | +/−3.5 | 59.0 | +/−4.7 |
| Butyraldehyde | 36.0 | +/−4.2 | 33.0 | +/−1.6 | 31.0 | +/−1.4 | 37.0 | +/−3.6 |
| Total | 1201.0 | +/−91.0 | 1012.0 | +/−46.1 | 988.0 | +/−50.6 | 1226.0 | +/−36.2 |

Samples 1 and 3 exhibited similar standard pressure drops of 146 and 144 mm WG, respectively. Samples 2 and 4 exhibited similar standard pressure drops of 163 and 160 mm WG, respectively.

As illustrated in Table 5 and FIG. 12, no impact of sodium glycinate treatment according to the foregoing description could be observed for puff number or delivery of tar, TPM, or CO.

As illustrated in Table 6 and FIG. 13, delivery of carbonyls, particularly formaldehyde and crotonaldehyde, by paper filters treated with AKD-2, PEG, and sodium glycinate according to the foregoing description is significantly less than delivery of carbonyls by untreated paper filters. For example, the filters in Samples 2 and 3, which were treated with AKD-2, PEG, and sodium glycinate, delivered 17% and 19% less total carbonyls, respectively, than the untreated filter in Sample 4. In particular, the filters in Samples 2 and 3 delivered 85% and 86% less formaldehyde, respectively, and 62% and 60% less crotonaldehyde, respectively, than the untreated filter in Sample 4. Further, the delivery of carbonyls by paper filters treated with AKD-2. PEG, and sodium glycinate according to the foregoing description is significantly less than delivery of carbonyls by filters treated with AKD-2 and PEG (but not sodium glycinate) according to the foregoing description. For example, the filter in Sample 1, which was treated with AKD-2 and PEG, delivered only 2% less total carbonyls than the untreated filter in Sample 4, while the filters in Samples 2 and 3 delivered 17% and 19% less total carbonyls, respectively, than the untreated filter in Sample 4.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A filter element comprising:

a base web containing wood pulp fibers, other plant fibers, or mixtures thereof, the base web being combined with at least a first additive and a second additive, the first additive being combined with the base web as a size, the first additive comprising a compound having one of the following structures:

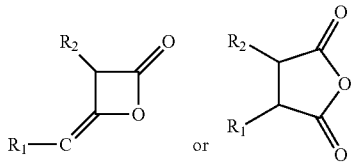

wherein R1 and R2 of the first additive comprise alkyl or alkenyl groups; and the second additive comprising a polyether, monopropylene glycol, sorbitol, glycerin, or mixtures thereof, the second additive having been applied to a surface of the base web, wherein the second additive is present on the surface of the base web in a pattern that covers from about 10% to about 90% of the surface area of the surface of the base web;

wherein the first additive is present in the base web in an amount of from 18% to about 30% by weight of the base web and wherein the second additive is present in the base web in an amount of from about 15% by weight to about 25% by weight of the base web;

wherein the base web is gathered, crimped, embossed, corrugated, or combinations thereof, into a rod form;

wherein the base web is free of synthetic fibers, wherein the base web of the filter element is continuous.

2. A filter element as defined in claim 1, wherein the first additive comprises an alkyl ketene dimer or alkenyl ketene dimer and wherein the second additive comprises a polyalkylene glycol.

3. A filter element as defined in claim 2, wherein the polyalkylene glycol has an average molecular weight of greater than about 500 g/mol.

4. A filter element as defined in claim 2, wherein the polyalkylene glycol comprises a polyethylene oxide, a methoxypolyethylene glycol, a polyethylene glycol derivative, or mixtures thereof.

5. A filter element as defined in claim 2, wherein the first additive is added to the base web, and wherein the first additive is present in the base web in an amount from about 20% to about 30% by weight of the base web.

6. A filter element as defined in claim 1, wherein the base web has a basis weight of from about 10 gsm to about 200 gsm.

7. A filter element as defined in claim 1, wherein the base web contains wood fibers or flax fibers.

8. A filter element as defined in claim 1, wherein the base web comprises reconstituted tobacco base sheet or reconstituted tobacco.

9. A filter element as defined in claim 1, wherein the base web further contains an amino acid, a peptide, or a salt of an amino acid.

10. A filter element as defined in claim 1, wherein the base web further contains a glycinate.

11. A smoking article comprising:
a column of tobacco;
a wrapping paper surrounding the column of tobacco;
a filter located adjacent to one end of the column of tobacco, the filter comprising a first segment and a second segment, wherein the first segment comprises the filter element of claim 1; and
a tipping paper attaching the filter to the column of tobacco.

12. A smoking article as defined in claim 11, wherein the filter removes at least 10% of phenol from mainstream smoke passing through the filter.

13. A smoking article as defined in claim 11, wherein the filter removes at least 10% of cresols from mainstream smoke passing through the filter.

14. A smoking article as defined in claim 11, wherein the filter removes at least 10% of crotonaldehyde from mainstream smoke passing through the filter.

15. An air filter comprising the filter element as defined in claim 1.

16. A tea product comprising tea leaves and a filter, the filter comprising a filter element as defined in claim 1.

17. A coffee filter comprising the filter element as defined in claim 1.

18. A filter element as defined in claim 1, wherein the first additive comprises a compound having one of the following structures:

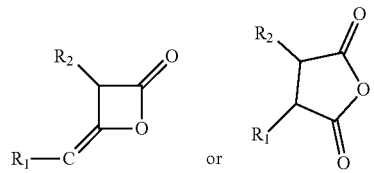

wherein R1 and R2 of the first additive comprise alkyl groups having a carbon chain length of from about 12 carbon atoms to about 28 carbon atoms.

19. A filter element comprising:
a base web containing wood pulp fibers, other plant fibers, or mixtures thereof, the base web being combined with at least a first additive and a second additive, the first additive being combined with the base web as a size, the first additive comprising a compound having one of the following structures:

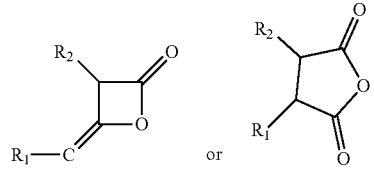

wherein R1 and R2 of the first additive comprise alkyl groups having a carbon chain length of from about 12 carbon atoms to about 28 carbon atoms; and
the second additive comprising a polyether, monopropylene glycol, sorbitol, glycerin, or mixtures thereof, the second additive having been applied to a surface of the base web, wherein the second additive is present on the surface of the base web in a pattern that covers from about 10% to about 90% of the surface area of the surface of the base web;
wherein the first additive is present in the base web in an amount of from 18% to about 30% by weight of the base web and wherein the second additive is present in the base web in an amount of from about 15% by weight to about 25% by weight of the base web;
wherein the base web is gathered, crimped, embossed, corrugated, or combinations thereof, into a rod form;
wherein the base web is free of synthetic fibers, wherein the base web of the filter element is continuous.

20. A filter element as defined in claim 19, wherein the first additive comprises an alkyl ketene dimer and wherein the second additive comprises a polyalkylene glycol.

* * * * *